United States Patent [19]

Legrand et al.

[11] 4,443,828

[45] Apr. 17, 1984

[54] LOW VOLTAGE CIRCUIT BREAKER

[75] Inventors: Michel Legrand; Paul Canonne, both of Barentin; Christian Brault, Pavilly, all of France

[73] Assignee: Merlin Gerin, Grenoble, France

[21] Appl. No.: 353,820

[22] Filed: Mar. 2, 1982

[30] Foreign Application Priority Data

Mar. 10, 1981 [FR] France ................................ 81 05153

[51] Int. Cl.³ ............................................... H02H 3/08
[52] U.S. Cl. .......................................... 361/93; 335/6;
 336/174; 361/44; 361/96; 361/115
[58] Field of Search ........................ 361/44, 45, 93, 96,
 361/99, 115; 335/6, 18; 336/138, 173, 174, 175,
 215; 324/127

[56] References Cited

U.S. PATENT DOCUMENTS 2,450,973 10/1948 Lingel .
3,761,777 9/1973 Willard et al. .......................... 361/96
4,037,183 7/1977 Gaskill ............................... 335/18 X
4,060,844 11/1977 Davis et al. ............................ 361/96
4,090,156 5/1978 Gryctho ................................. 335/6
4,181,389 1/1980 Kiesel .
4,209,817 6/1980 McGinnis .

FOREIGN PATENT DOCUMENTS 1513455 3/1970 Fed. Rep. of Germany .
 623728 6/1927 France .
2400765 8/1977 France .
 174475 2/1922 United Kingdom .

Primary Examiner—Harry E. Moose, Jr.
Attorney, Agent, or Firm—Parkhurst & Oliff

[57] ABSTRACT

A low voltage circuit breaker with a current sensing unit having a magnetic circuit with three branches, the secondary winding being mounted on the intermediate branch and the primary winding being formed by a conductor selectively passing through one or two of the openings provided between the secondary winding and the outer branches. The circuit breaker comprises an instantaneous electromagnetic trip mechanism and a static long time and short time delay trip unit, the latter unit being governed by a signal attenuated by a rating selection device.

4 Claims, 5 Drawing Figures

LOW VOLTAGE CIRCUIT BREAKER

The invention relates to a low voltage circuit breaker comprising:
- a tripping control mechanism governed by a tripping relay
- a current sensing unit associated with each phase of the circuit protected by the circuit breaker in order to detect the current flowing in the respective phase,
- and an electronic unit to process the signal emitted by the said current sensing unit and to deliver a tripping signal to the said relay when the said current exceeds a predetermined value of a function.

A prior art circuit breaker of the type mentioned with a static tripping unit has the advantage that its adjustments can be easily modified by the fitter or the user and that its adjustment range can be extended. Electronic tripping units are an improvement over thermal and electromagnetic trip mechanisms in high rating circuit breakers, but up till now they could not be used for low rating circuit breakers due to their cost and the difficulties encountered in accommodating them inside the circuit breaker box. One of the critical components in static tripping units is the current sensing unit which must deliver a signal that is linearly proportional for a wide interval of flow current. The sensor must be constant with respect to temperature and its cost must not render its use prohibitive in small circuit breakers.

An object of this invention is to eliminate the disadvantages encountered with prior art static tripping units so that these tripping units can be employed in low rating, low voltage circuit breakers.

A particular feature of the circuit breaker according to the invention is that the said current sensing unit comprises:
- a magnetic circuit with three parallel branches
- a secondary winding mounted on the intermediate branch
- and two openings, each provided between the winding and one of the outer branches and through which a conductor can be run that forms selectively a primary winding with one or two paths for the said current sensing unit.

The primary winding is made up of a single path or of two paths of a phase conductor through these openings. By using a single path, the signal delivered by the sensing unit is halved and the same static tripping unit can be used for two different ranges of circuit breakers. A convenient double path primary winding can be achieved by one conductor going through one of the openings and a second conductor going through the other opening, with the ends of these two conductors joined by a strip welded to each conductor. In the case of a single path, the winding can be made in a similar fashion by running one of the conductors outside the magnetic circuit.

Another object of this invention is to avoid any adjustment of the time-delayed tripping device, currently called thermal trip mechanism, on mounting or installing the circuit breaker. It was found that the electronic circuit can be easily adjusted during manufacture and that the production of an adjustable sensing unit would do away with the need for any further adjustment, and thereby constitute a saving in the cost of manufacturing the static tripping unit.

The invention also relates to a manufacturing process of a sensing unit that is adjustable by varying a gap arranged between two parts of the magnetic circuit. A feature of the process according to the invention is that a secondary winding is placed on one of these circuit parts and is connected to a measurement instrument, while a conductor running through an opening in the magnetic circuit carries a predetermined current that excites the sensing unit and that the relative position of the two circuit parts is modified in order to vary the gap and to adjust a predetermined response characteristic from the sensing unit.

The magnetic circuit can be conveniently placed in a mould and held in position by a pin constituting the exciting conductor. An automatic device adjusting the gap is controlled by the signal delivered by the secondary winding, in such a way that the value of this signal corresponds to a set value. After moulding in the embedding material, the two parts comprising the magnetic circuit are permanently positioned in relation to one another and the value of the gap is maintained constant.

The elimination of bimetal elements is especially beneficial in multiple rating circuit breakers since rating changeover shunts are eliminated at one and the same time. Since the heating of the breaker is reduced, its rating range can be increased.

The invention also relates to a multiple rating low voltage circuit breaker comprising a pair of separable contacts per pole, a manual and/or automatic control mechanism of the separable contacts, a device to select the rating of the circuit breaker and a device to detect overload currents that governs the said mechanism to trip automatically and open the said contacts when the overload current exceeds a predetermined function of the selected rating, this circuit breaker having as a specific feature the fact that the said overload detection device comprises an instantaneous electromagnetic trip mechanism with a set tripping threshold, that is a multiple of the highest rating of the circuit breaker, and a static tripping unit that ensures a long delay protection and a short delay protection, governed by a current sensing unit that delivers a signal proportional to the current flowing through the circuit breaker, which signal is applied to the said rating selection device, that attenuates the value of the said signal depending on the selected rating, the said modified signal then being applied to an electronic processing unit which has a long delay circuit and a short delay circuit, the long delay circuit delivering a tripping signal with a long time-lag for a low overload current interval, and the short delay circuit delivering a tripping signal with a shorter time lag for a higher overload current interval; the whole system being so designed that for the lowest selected rating, the long time lag current interval, the short time lag current interval, and the instantaneous tripping threshold, follow one another in that order, whereas for the highest rating, the instantaneous tripping threshold immediately follows the long time lag current interval.

High overloads are dealt with by a traditional electromagnetic trip mechanism with set tripping threshold, and the static tripping unit is only called upon for and subjected to relatively low overload currents. This hybrid solution permits a saving in production costs of the static tripping unit without notably complicating the design of the circuit breaker. The change in rating is only effective on the static tripping unit by providing a voltage divider bridge that attenuates the signal delivered by the current sensing unit.

When the selected rating is low, the breaker is oversized and can withstand the tripping delay entailed by the long delay circuit of the static tripping unit without any major inconvenience. In the case of a high overload, in particular a short-circuit on one of the highest rating breakers, tripping must be instantaneous, and, in accordance with the invention, this is ensured by the traditional electromagnetic trip mechanism.

This static tripping unit is of the self-powered type, in which the tripping energy is stored in a capacitor. The current sensing unit and the electromagnetic trip mechanism can be placed conveniently on top of one another inside the circuit breaker box, with the conductor forming the winding of the electromagnetic trip mechanism led directly to the sensing unit where it goes through one of the openings before being connected to the connecting strip in the case of a double path sensing unit.

The multiple rating circuit breaker according to the invention is particularly attractive from the cost viewpoint when it ensures a differential protection at the same time. In this case it is profitable to have the tripping relay common to the overload tripping unit and the differential tripping unit, and maximum profitability is achieved in the case of multiple rating, multi-pole, differential tripping, such as for circuit breakers on consumer lines.

Other features and advantages of the invention will appear more clearly in the following description of various methods of construction, given as typical but non-exhaustive examples, and illustrated in the attached drawings in which.

In the following the invention is described in its application to a branch connection circuit breaker of the type described in French Pat. No. 2,295,553, which may be conveniently referred to for additional details on the design of this circuit breaker, but obviously the invention applies equally well to any other type of differential protection or simple overload protection circuit breakers.

Figure 1:
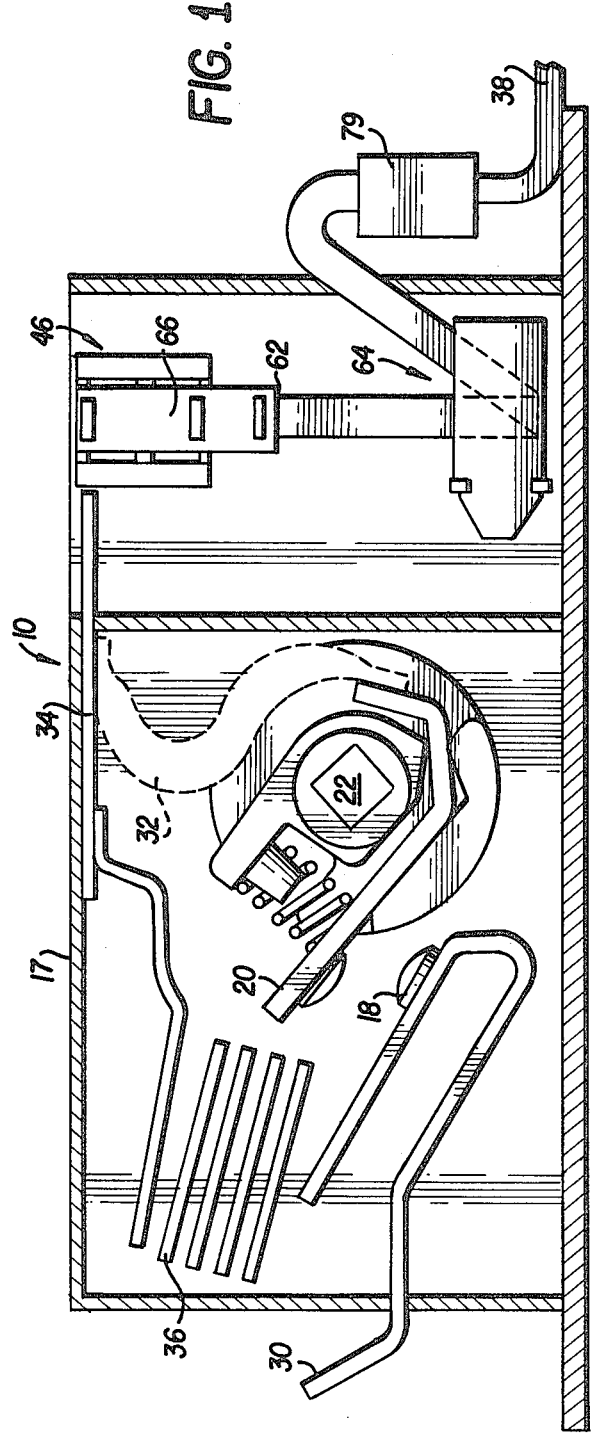
FIG. 1 is a schematic elevation view of one pole of a circuit breaker according to the invention, in which the side is assumed to be removed.
Figure 2:
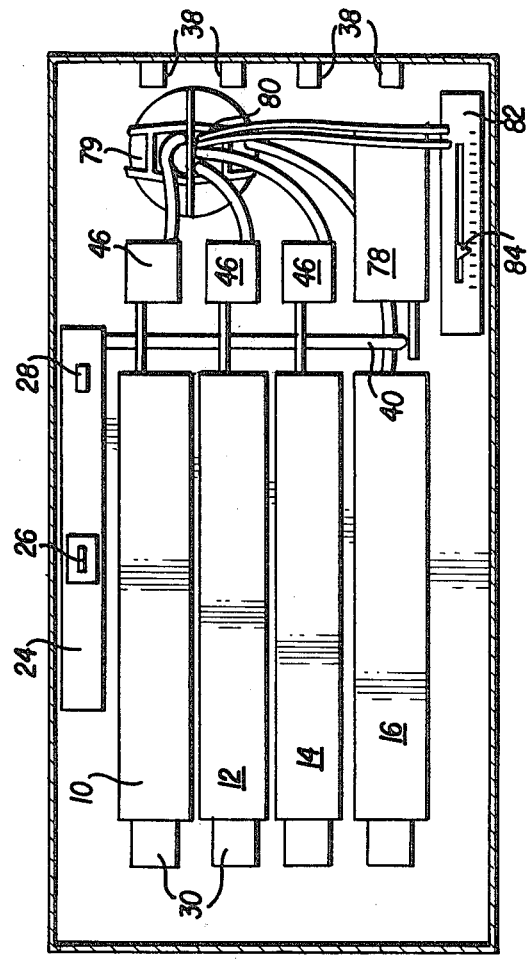
FIG. 2 is a schematic plan view of the circuit breaker shown in FIG. 1.

FIGS. 1 and 2 show the four poles 10, 12, 14, 16 (three phases plus neutral) each housed in an insulating box 17 and comprising a pair of stationary (18) and moving (20) contacts. Moving contact 20 is carried on a rotating bar (22) linking the different poles, 10, 12, 14, 16 to control mechanism (24), which has a closing control button (26) and tripping button (28). Stationary contact (18) is connected to a connection terminal (30) whereas moving contact (20) is connected by a braid (32) to plate (34) pressed against the upper wall of insulating box (17). One of the ends of plate (34) is connected to an end-plate of a breaking device (36) associated with the pair of contacts 18, 20, while the opposite end of plate (34) goes through an aperture provided in box (17) in order to connect to opposite terminal (38) by means of the detection devices described in detail hereafter. All of the poles 10, 12, 14, 16 are identical and there can be naturally any number of them, the whole pole assembly being controlled by a single mechanism (24). Tripping of the circuit breaker by opening of all the poles 10 to 16 can be controlled by hand by pressing push-button (28) or by sliding tripping rod (40). Such a circuit breaker is well known in the art and will not be described further here.

Figure 4:
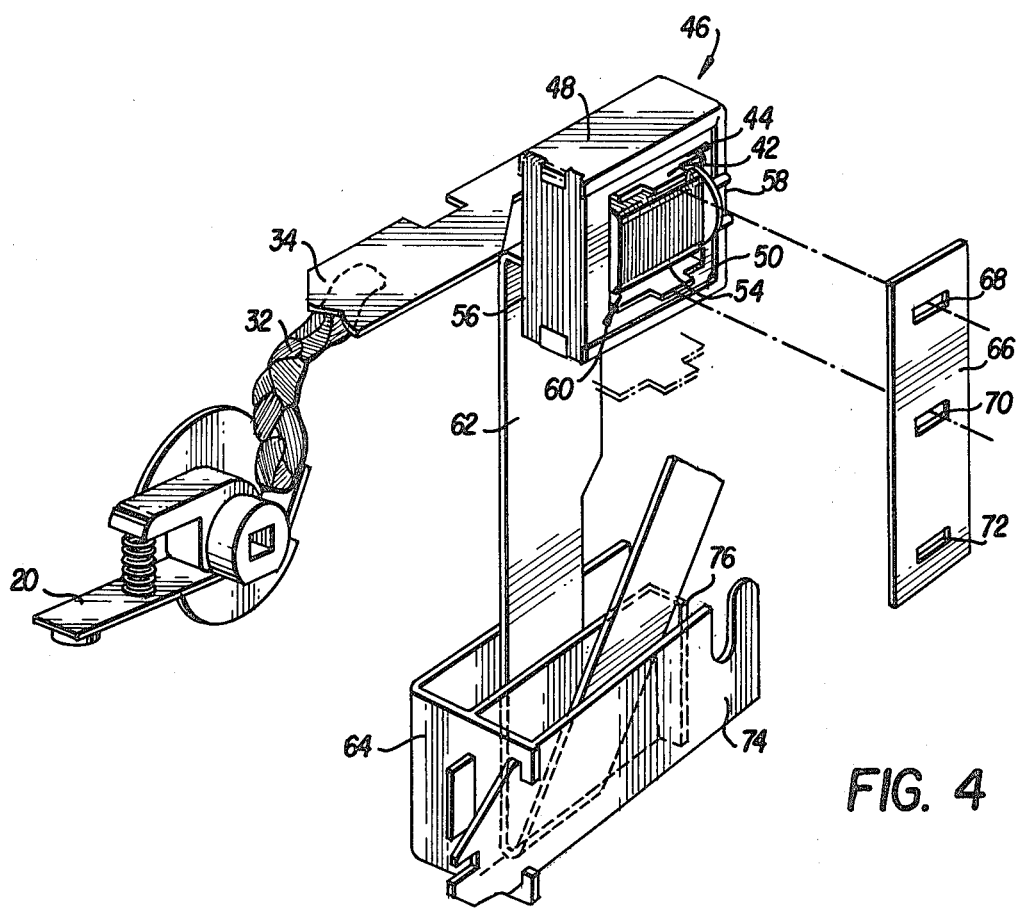
FIG. 4 is a schematic perspective view of a detail of FIG. 1.
Figure 5:
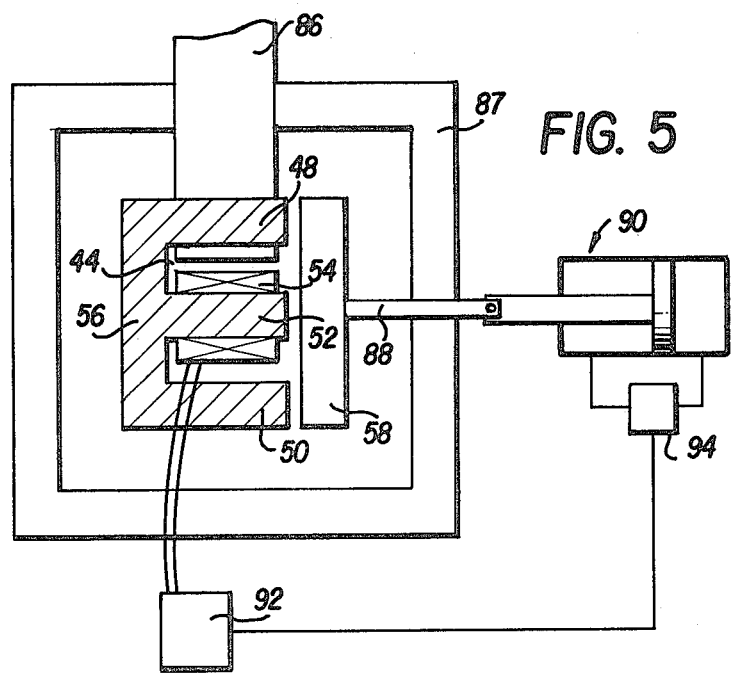
FIG. 5 illustrates an embedding system with the possibility of adjusting the gap of the sensing unit in accordance with the invention.

Referring more specially to FIGS. 1, 4 and 5, it will be noticed that the end of plate (34) outside box (17) is shaped into a tongue (42) going through opening (44) in current sensing unit (46). Current sensing unit (46) has three parallel branches, two outer branches (48, 50), and an intermediate branch (52) which carries a coil (54) constituting the secondary winding of sensing unit (46). The magnetic circuit has two parts, (56, 58) separated by a small gap of variable width. Opening (44) accommodating tongue (42) is provided between coil (54) and branch (48) and an opening (60) is similarly provided between coil (54) and the outer branch (50) of the magnetic circuit. The end of conductor (62) goes through opening (60) and constitutes the winding of electromagnetic trip mechanism (64) adjacent to sensing unit (46). A connection strip (66) with slots 68, 70, 72, joins the spigot ends of tongue (42) and conductor (62) which fit into slots 68, 70. The mechanical and electrical connection is completed by welding. Tongue (42) and conductor (62) form two paths of a primary winding of sensing unit (46), the secondary winding of which, formed by coil (54), delivers a signal proportional to the to the current flowing in the primary winding. Tongue (42) and conductor (62) are flat-shaped and fill nearly all of openings 44, 60. On FIG. 4 there is a schematic illustration in light lines of the design of a single path sensing unit using the same components, in which the end of conductor (62) lies outside the magnetic circuit of sensing unit (46).

Standard type electromagnetic trip mechanism (64) with armature (74) and magnetic-bar (76), surrounded by one or several turns of conductor (62), is located below sensing unit (46) to permit a direct link via conductor (62). On leaving electromagnetic trip mechanism (64), conductor (62) crosses toroidal core (79) of a differential transformer before connecting to output terminal (38). Each phase pole has a sensing unit (46) and an electromagnetic trip mechanism (64), whereas core (79) is common to the various poles, and in the example illustrated on FIG. 2, core (79) is crossed by the four conductors (62) of the various poles. Core (79) carries a secondary winding (80) which delivers a tripping signal when a differential current occurs. The signals delivered by the secondary windings of sensing units (46) and differential transformer (79) are applied to an electronic unit (82) which governs a tripping relay (78) which can be chosen to advantage of the biased type well-known to specialists in the field, which actuates tripping rod (40) when it is excited by a tripping current.

Figure 3:
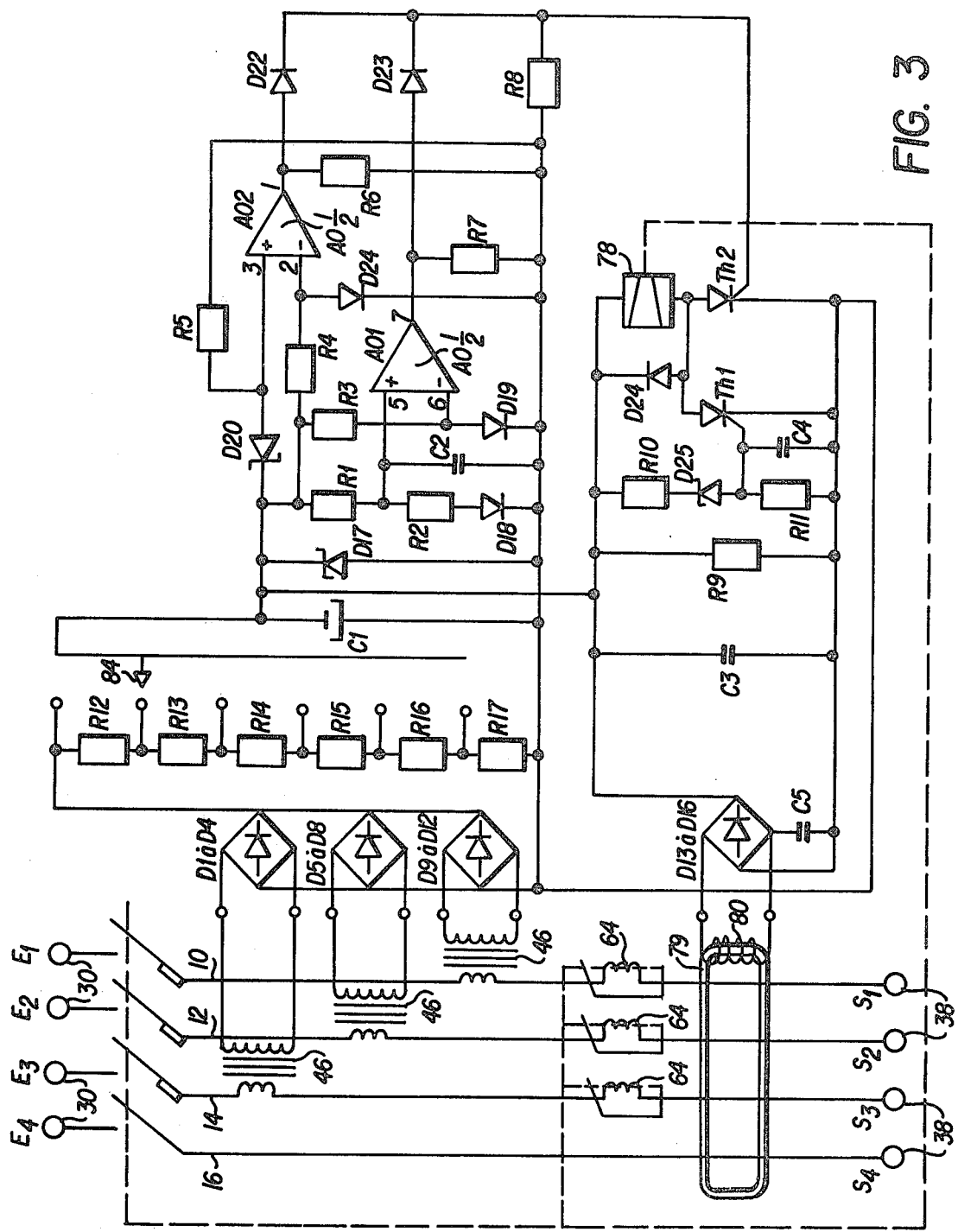
FIG. 3 is a diagram of the tripping unit of the circuit breaker shown in FIGS. 1 and 2.

FIG. 3 is the electronic diagram of processing unit (82). The signals delivered by the three sensing units (46) are rectified in three diode bridges D1 to D4 ; D5 to D8 and D9 to D12. The outputs from the bridges are connected in parallel and supply at constant load a voltage divider bridge with 6 resistors R12, R13, R14, R15, R16, R17, connected in series with voltage pick-off points via slide (84). The number of resistors and pick-off points can naturally be various, and the voltage divider bridge may be formed simply by a potentiometer. The voltage picked off at slide (84) corresponds to the magnitude of the current flowing through sensing units (46) corrected or attenuated by the voltage divider bridge R12 to R17. Slide (84) is connected to capacitor C1, which is charged by the voltage delivered by slide (84) and constitutes an energy store which serves both to actuate tripping relay (78) and to power the amplifiers. Capacitor C1 is shunted by a Zener diode D17, which is a safety diode protecting the inputs of the operational amplifiers. Connected to the terminals of capacitor C1 there are, on the one hand, a biasing circuit with resistor R3 and diode D19 of the negative input 6 of a first operational amplifier AO$_1$, and on the other hand a time-lag circuit with resistor R1 and capacitor C2 connected in series, the positive input 5 of operational amplifier AO$_1$ being connected to the intermediate point between resistor R1 and capacitor C2. Connected to the terminals of capacitor C2 there is a discharge circuit with resistor R2 in series with a diode D18 used for temperature compensation. Output 7 from operational amplifier AO$_1$ is connected by diode D23 to the trigger of a thyristor TH$_2$ connected in series with tripping relay (78) in the discharge circuit of capacitor C1. Under normal operating conditions, the voltage at the terminals of capacitor C2 never reaches a vlaue high enough to activate operational amplifier AO$_1$. In the case of an overload, detected by one of the sensing units (46), capacitor C2 is charged via resistor R1 and as soon as the voltage at the terminals of capacitor C2 exceeds the value of the voltage applied at the negative input 6 of operational amplifier AO$_1$, this amplifier is activated and excites the trigger of thyristor TH$_2$ which becomes conducting. The energy stored in capacitor C1, flows through relay (78) and thyristor TH$_2$ and causes the circuit breaker to trip. These components constitute the long delay tripping circuit, the time lag corresponding to the gradual charging of capacitor C2 via resistor R1.

The negative input of a second operational amplifer AO$_2$ is biased in a similar fashion by the voltage of a diode D24 and a resistor R4, connected in series to the terminals of capacitor C1. The positive input 3 of operational amplifier AO$_2$ is biased by a resistor R5 and can be controlled by the conduction of a Zener diode D20 connected to capacitor C1. Output 1 of the second amplifer AO$_2$ is connected to the trigger of thyristor TH$_2$. It is clear that when the voltage at the terminals of capacitor C1 is high and exceeds the threshold of Zener diode D20, this diode will become conducting and will activate operational amplifier AO$_2$ which delivers a tripping signal to thyristor TH$_2$, which, on becoming conducting, excites relay (78) and causes the circuit breaker to trip. This second circuit constitutes a short delay tripping circuit which is effective in the case of an overload that is greater than the overload entailing activation of the long delay tripping circuit.

The secondary winding (80) of differential core (79) supplies a rectifier bridge with diodes D13 to D16 having an output connected to capacitor C3. Connected to the terminals of capacitor C3 there is a circuit comprising a resistor R10, a Zener diode D25 and a resistor R11 mounted in series. The trigger of a thyristor TH$_1$ is connected to an intermediate point between diode D25 and resistor R11, so that thyristor TH$_1$ is activated when Zener diode D25 becomes conducting. Resistor R9, connected to the terminals of capacitor C3, allows a gradual discharge of capacitor C3 to avoid wanton tripping following the pile-up of spurious current micro-peaks. Thyristor TH$_1$ is connected in series with relay (78) to the terminals of capacitor C3 and it will be clear that when thyristor TH$_1$ becomes conducting, capacitor C3 discharges to actuate relay (78). On the occurrence of a differential fault, detected by toroidal core (79) capacitor C3 charges and on reaching the threshold of Zener diode D25 this diode becomes conducting and activates thyristor TH$_1$, causing exciting of relay (78) and tripping of the circuit breaker. The same tripping relay (78) can be selectively excited either by the overload long delay or short delay tripping circuit, or the differential tripping device. These electronic circuits may be of another type and will not be further described here, except to emphasize that they are self-powered devices that require no additional source of power. FIG. 3 includes some secondary anti-interference or protective components that are not mentioned in the description.

The operation of the circuit breaker according to the invention is described hereafter with reference to a particular example, but obviously the values quoted in the example may be totally different:

The six positions of slide (84) of the voltage divider bridge R12 to R17 can attenuate the signal delivered by sensing units (46) in ratios 1, 1.25, 1.333, 1.5, 1.666 and 2, respectively. In the case of a 30 Ampere minimum rating circuit breaker, it is clear that, depending on the position of slide (84) the rating can be adjusted to any of values: 30, 37.5, 40, 45, 50, 60 Amperes. These values are valid for current sensing unit (46) with double conductor path 34, 62, as illustrated on FIG. 4. With a single conductor path, 34, with the lower conductor (62) outside the magnetic circuit of sensing unit (46), the values quoted above can be doubled, to give the following choice of ratings: 60, 75, 80, 90, 100 and 120 Amperes. The change of rating by simply moving slide (84) can be performed locally without any difficulty. The number of paths of the primary winding of sensing unit (46) can only be changed if the circuit breaker box is opened and this is done at the Works. The advantage in this case is that the same components can be used to produce a second range of circuit breakers with a higher rating. For instance, electromagnetic trip mechanism (64) is adjusted at 600 Amperes, which is a value compatible with the various ratings selected. The tripping threshold is fixed, whatever the rating selected. In the case of a circuit breaker adjusted for a low rating, for instance 30 Amperes, and a low overload, e.g. less than 300 Amperes, the electromagnetic trip mechanism will not be called upon. The overload is detected by sensing units (46) which deliver a signal to the long delay and the short delay circuits of the static tripping unit. The activating threshold of Zener diode D20 of the short delay circuit is not reached and tripping of the circuit breaker is activated by the long delay circuit after a time lag that depends on the time to charge capacitor C2 which activates operational amplifier AO$_1$ and triggers thyristor TH$_2$ after a predetermined time which is a function of the overload value. In the case of a high overload, e.g. greater than 300 Amperes but less than 600 Amperes, corresponding to the activating threshold of the magnetic trip mechanism, the short delay circuit operates by activating Zener diode D20, which activates operational amplifier AO$_2$, making thyristor TH$_2$ conducting. A short-circuit is eliminated instantaneously by electromagnetic trip mechanism (64) which acts before the short time lag or long time lag electronic tripping unit.

When the circuit breaker is adjusted for a higher rating, e.g. 90 Amperes, the operating interval of electromagnetic trip mechanism (64) and that of the short time lag tripping unit coincide and the faster electromagnetic trip mechanism supplants the short time lag static tripping unit. When the circuit breaker is adjusted for a high rating, high overloads are cut out instantaneously by electromagnetic trip mechanism (64) while low overloads are dealt with by the long time lag electronic tripping unit.

A differential fault is detected by toroidal core (79) which, by making thyristor TH₁ conducting, activates the same tripping relay (78) entailing the opening of all the poles of the circuit breaker.

Note that the same circuit breaker can be equipped with either traditional electromagnetic trip mechanisms and bimetal elements or a hybrid tripping unit in accordance with the invention, the overall dimensions of this last unit enabling it to be accommodated in the housing provided initially for the bimetal elements.

The switching of ratings takes place at low voltage and non-local or remote controlled switching is possible by any suitable means. The static tripping unit according to the invention can also permit a modification of the long delay tripping curve by acting on the time constant of the resistor R1-capacitor C2 circuit, without significantly modifying the circuit breaker. The static tripping unit can also be improved or adapted to operate as a load discharging circuit breaker by picking up a load discharging signal at the terminals of capacitor C1 in order to trip a circuit breaker on a non-priority downstream circuit.

It was found that the electronic circuit breaker according to the invention requires no adjustment on assembly or in operation, provided the sensing units (46) availabe have a low dispersion. FIG. 5 illustrates an embedding and gap adjustment system for sensing unit (46) to obtain a predetermined response characteristic. On FIG. 5, the two parts of magnetic circuit 56, 58, are positioned in mould (87); coil (54) has been previously mounted on branch (52) of the magnetic circuit. Circuit part (56) is carried by pin 86 going through opening (44) of the magnetic circuit and connected to a current supply source (not shown). The other part (58) of the magnetic circuit carries a non-magnetic tail (88) going through the wall of the mould and connected to a rod of jack (90) that can bring the two parts 56, 58, of the magnetic circuit closer together or put them farther apart by varying the gap. Coil (54) is connected by conductors crossing mould (87) to a measuring instrument (92) which governs control device (94) of jack (90). The movement of part (58) of magnetic circuit is governed via units 92, 94, by the signal delivered by coil (54) for a given exciting current flowing through conductor (86). In this way it is possible to adjust the gap of magnetic circuit 56, 58, automatically to obtain a predetermined signal. Once the adjustment is made, plastic or fast-setting resin is injected into the mould and fixes parts 56, 58 of the magnetic circuit thereby ensuring a constant gap. Pin (86) is removed to free opening (44) through which conductor (34) will be run when the breaker is mounted, and it is clear that sensing unit (46) will be operating under the same conditions as when its gap was adjusted before moulding. In this way the value of the signal delivered by sensing unit (46) in the mounted circuit breaker is guaranteed to correspond exactly to that of the signal adjusted during moulding. The device illustrated on FIG. 5 is of course simplified and can be achieved by any other means ensuring relative displacement or adjustment of the gap and still remain within the scope of the invention. Pin (86) is useful in positioning the magnetic circuit inside mould (87) and a core (not shown) can be inserted in the location of opening (60).

The invention is obviously not limited to the construction mode described more particularly herein above and illustrated on the various figures.

What is claimed is:

1. A low voltage circuit breaker for protecting an electrical power circuit having a plurality of power conductors against fault current conditions comprising:
   a pair of contacts for each power conductor,
   a tripping control mechanism effective to separate said pair of contacts,
   a tripping relay to operate said tripping control mechanism,
   a current sensing unit associated with each of the power conductors of the circuit protected by the circuit breaker to detect the current flowing in the respective power conductors and develop an output signal corresponding to the current in said power conductors,
   and an electronic signal processing unit to process the output signal emitted by the said current sensing unit in order to deliver to the said relay a tripping signal when the said current exceeds a predetermined threshold, said current sensing unit including:
   a magnetic circuit with three parallel branches, two outer and one intermediate branch,
   a secondary winding mounted on the intermediate branch and providing said output signal,
   two openings each provided between the winding and one of the outer branches,
   and a primary winding serially connected with said power conductor and having a conductor portion selectively running through one or two of said openings to provide a primary winding with one or two current paths.

2. A circuit breaker as claimed in claim 1, said conductor portion constituting the primary winding with two paths, having a conducting plate with a flat end going through one of the openings, a flat conductor inserted in the other opening and a connecting strip joined on the one hand, to the said flat end, once the latter is inserted in the said opening, and on the other hand to the end of the flat conductor.

3. A circuit breaker as claimed in claim 1, said conductor portion constituting a primary winding with a single path, having a conducting plate with flat end going through one of the openings and a connecting strip joined, on the one hand to the said flat end once the latter is inserted in the said opening, and to a conductor outside the said magnetic circuit, on the other hand.

4. A circuit breaker as claimed in claim 1, having, associated with each of the respective power conductors, an electromagnetic trip mechanism, the said current sensing unit and the said electromagnetic trip mechanism being placed one on top of the other, with the said conductor portion forming the winding of the current sensing unit and of the electromagnetic trip mechanism.

* * * * *